March 8, 1927.
G. L. BILBREY
1,620,320
FERTILIZER DISTRIBUTOR
Filed June 3, 1925    2 Sheets-Sheet 1
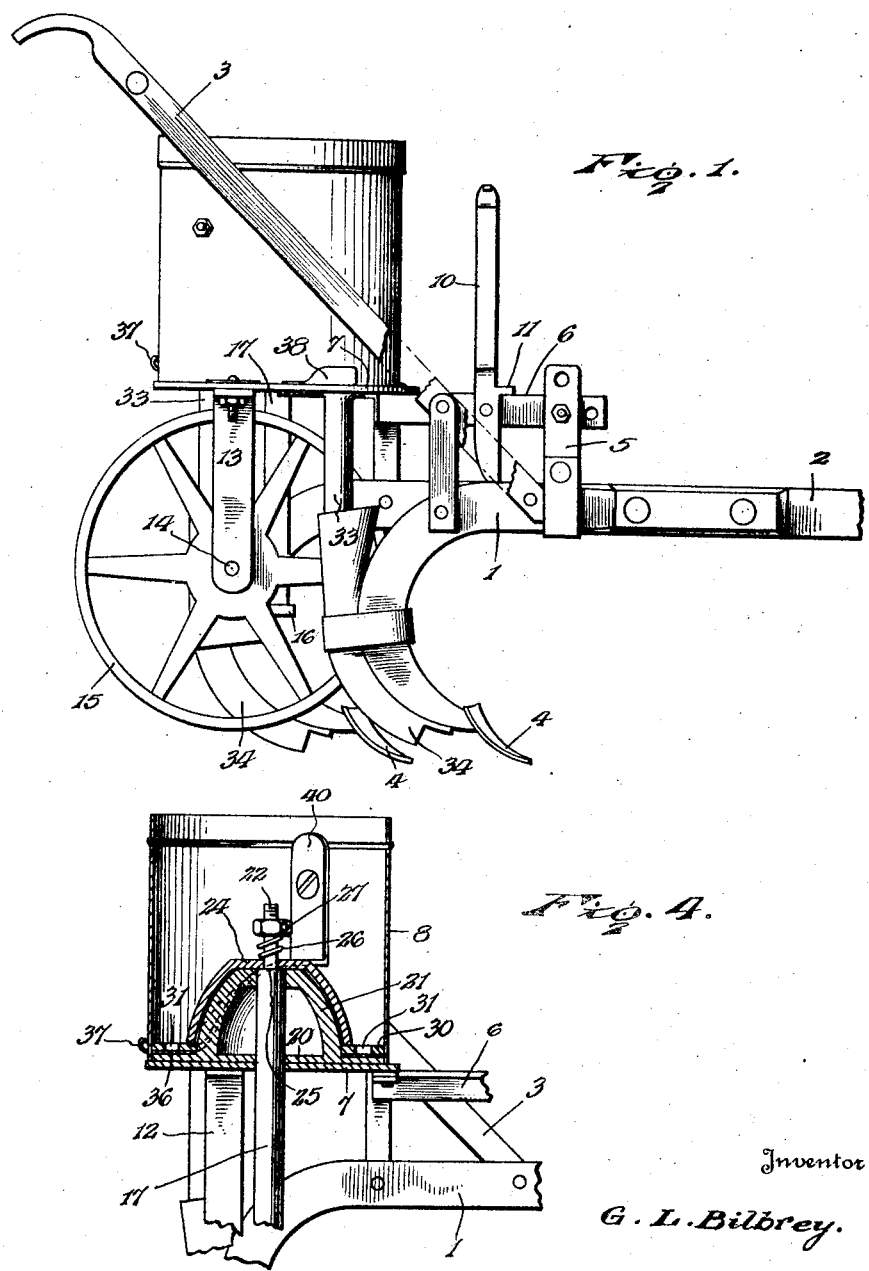

March 8, 1927.
G. L. BILBREY
1,620,320
FERTILIZER DISTRIBUTOR
Filed June 3, 1925    2 Sheets-Sheet 2
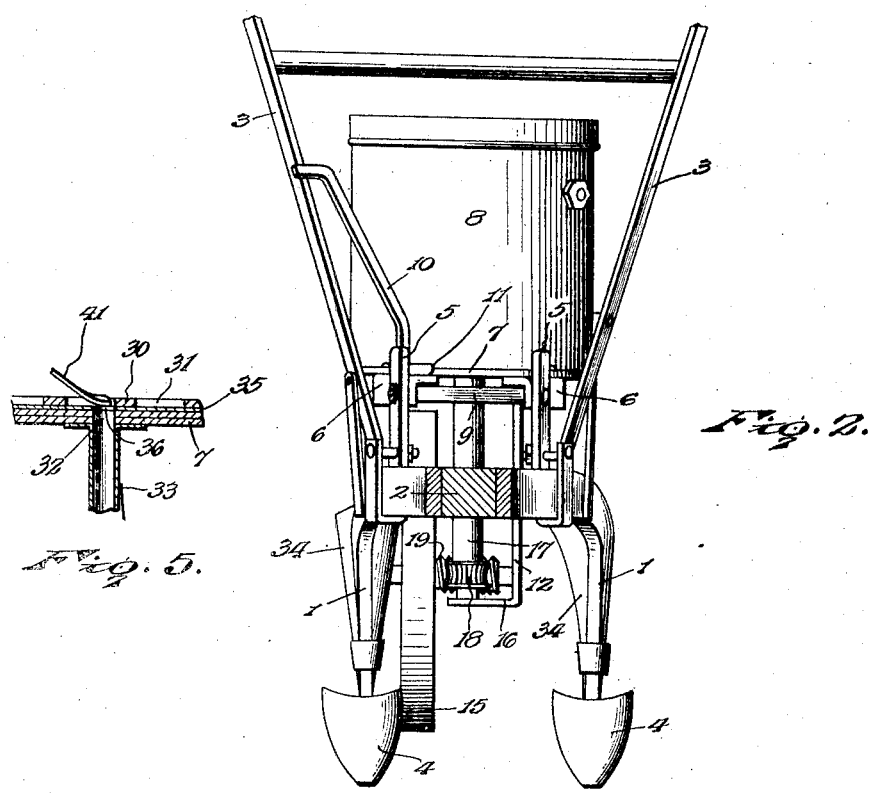
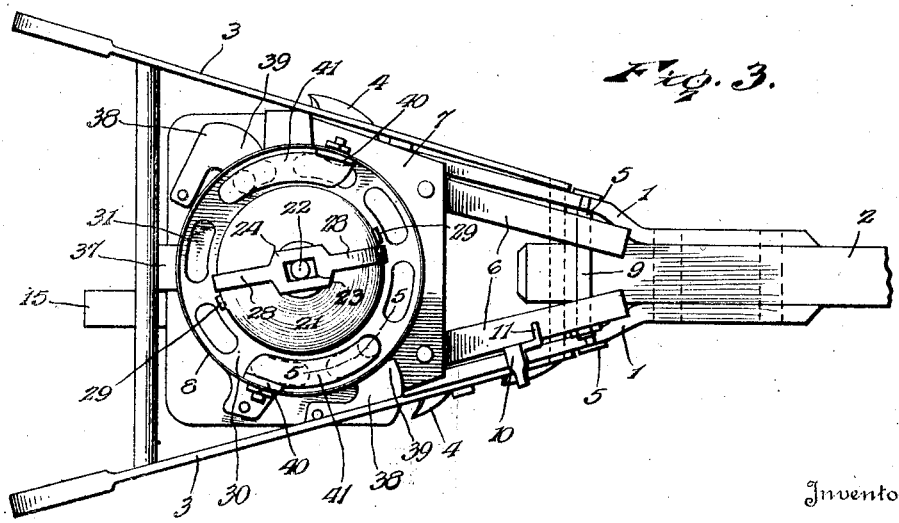

Patented Mar. 8, 1927.

1,620,320

UNITED STATES PATENT OFFICE.

GEORGE LANSDEN BILBREY, OF HERMITAGE SPRINGS, TENNESSEE, ASSIGNOR OF ONE-HALF TO J. B. FREEMAN, OF LAFAYETTE, TENNESSEE, AND ONE-FOURTH TO JAMES R. VAUGHN, OF RED BOILING SPRINGS, TENNESSEE.

FERTILIZER DISTRIBUTOR.

Application filed June 3, 1925. Serial No. 34,717.

This invention relates to fertilizer distributors and has for its primary object the provision of a fertilizer distributor which may be mounted upon a plow or cultivator and arranged to deposit the fertilizer immediately in rear of the plow blades or cultivator shovels. The invention also has for its object the provision of a fertilizer distributor which will be positively actuated to prevent clogging of the fertilizer within the hopper and will be equipped with means whereby the flow of the fertilizer may be regulated. These stated objects, and other objects which will hereinafter incidentally appear, are attained in such a mechanism as is illustrated in the accompanying drawings, and the invention resides in certain novel features which will be particularly pointed out in the appended claims.

In the drawings:

Figure 1 is a side elevation of a fertilizer distributor embodying my invention and mounted upon a cultivator;

Fig. 2 is a front elevation with the tongue or beam of the cultivator in vertical section;

Fig. 3 is a plan view with the top of the hopper removed;

Fig. 4 is a vertical section taken longitudinally through the hopper, and

Fig. 5 is a detail section.

The cultivator comprises beams 1, a tongue 2 and handles 3 of the usual or any approved form, the blades or shovels 4 being secured to the rear down-turned ends of the beams, as shown clearly in the drawings. In carrying out my present invention, I secure to the beams 1, in front of the handles, short posts 5, to the upper ends of which are secured the front ends of diverging frame bars 6, the rear ends of these frame bars being secured to the front corners of a platform 7 upon which a hopper 8 is mounted. The frame bars 6 are pivotally held to the posts 5 by the bolt or pin 9 so that the frame bars may be swung downwardly or upwardly accordingly as it is desired to effect distribution or to have the distributor remain inactive, and to effect such adjustment of the frame bars and the parts carried thereby I pivotally mount upon one frame bar a hand lever 10 which may be easily set by the driver, it being understood that my device is intended more particularly for attachment to the type of cultivators known as walking cultivators. The lower end of the lever 10 is adapted to bear upon the upper edge of the respectively subjacent cultivator beam 1 and it will be readily seen that, if the lever be disposed vertically, the lower extremity thereof will bear upon the cultivator beam and maintain the frame bars 6 in a raised position, as shown clearly in Fig. 1. If the upper end of the hand lever be swung rearwardly, the lower end thereof will, of course, be released from its binding pressure with the cultivator beam and the weight of the frame bar 6 and the parts connected thereto will effect descent of the distributor so that it will then become operative. To prevent the lever being swung so far forwardly that it will not effect the desired lifting of the distributor or, if the distributor be lifted it will permit its immediate descent, I provide a stop finger 11 which projects laterally inwardly from the side of the lever to engage the upper side of the adjacent frame bar 6, as shown in Figs. 1 and 3.

Secured to the under side of the platform 7 are hangers 12 and 13 which carry in their lower ends a driving shaft 14 upon which is secured a ground wheel 15 adapted, when the distributor is in lowered position, to engage the ground and receive tractive force therefrom whereby it will rotate. The wheel will, therefore, constitute not only a support for the distributor but will also constitute the driving element thereof. The lower end of the hanger or bracket 12 is also turned inwardly, as indicated at 16, so as to form a support for a vertical shaft 17 which extends up into the hopper and is equipped at its lower end with a worm pinion 18 meshing with a worm 19 upon the main shaft 14. The shaft 17 will, consequently, be rotated as the distributor travels over the field. The platform 7 has formed upon its upper side within the hopper a circular plate 20 which fits snugly within the lower end of the hopper, as shown clearly in Fig. 4, and disposed concentrically upon this plate 20 is a pivot or conical hub member 21 in the upper end of which the shaft 17 is rotatably supported. The upper extremity of the shaft is reduced and, as indicated at 22, has a flat-sided portion to engage in a slot 23 formed in the head 24 of a stirrer and distributor whereby the said stirrer and distributor will be caused to rotate with the shaft. The head 24 of this stirrer and distributor rests upon an annular shoulder 25, formed upon the shaft at the base of its reduced portion, and is held yieldably to the said shoulder by a spring 26 coiled around its reduced portion between the head and a nut 27 threaded onto the said reduced extremity. From the head 24, fingers 28 extend over the hub member 21 and conform to its outline so that, as the shaft is rotated, these fingers will be moved through the body of fertilizer within the hopper and will thereby prevent the same clogging so as to choke the operation. The lower extremities of these fingers are arranged adjacent lugs 29 formed at diametrically opposite points upon a flat ring 30 which is seated upon the circular plate 20 around the lower end of the hub member 21 and fits closely to the wall of the hopper. This ring is provided with arcuate openings 31 therethrough to permit escape of the fertilizer, and these arcuate slots are caused to successively register with discharge openings 32 formed in the bottom of the hopper immediately over discharge spouts 33 leading into shoes 34 which are secured to the down-turned ends of the respective cultivator beams so that the fertilizer will be deposited in the furrows formed by the shovels 4. The distributor ring 30 is caused to revolve around the hub member 21 by the engagement of the fingers 28 with the lugs 29 in an obvious manner, and it will be noted that the fertilizer will, consequently, not flow in a continuous stream from the hopper but will be permitted to escape only as a slot 31 registers with a discharge opening 32. A governor plate 35 is also fitted about the hub member 21 between the distributor ring 30 and the bottom of the hopper, and this governor plate or ring is formed with openings 36 therein which are adapted to register with the openings 32 when in one position of the governor plate and in another position may be entirely out of alinement with the opening 32 so as to entirely cut off the flow. Of course, the governor plate may be set at any intermediate position and thereby permit the flow to be free or more or less retarded, as may be desired. This governor plate is provided with an extension or handle member 37 which projects through the rear portion of the hopper but fits closely within the opening provided therefor so that it may be easily shifted to the desired position. It is also possible to permit flow through one discharge spout while cutting it off from the other discharge spout, and for this purpose I provide the cut-off plates 38 which are pivotally mounted upon the platform 7 at opposite sides of the hopper and are provided with extensions 39 arranged to extend through openings provided therefor in the sides of the hopper and project across the discharge openings between the regulating ring and the distributor ring. Either one of these cut-off plates may be swung inwardly to cut off the flow without affecting the position of the other cut-off plate. To prevent backward movement of the distributor ring and also to aid in preventing the clogging of the device, I secure to the wall of the hopper, within the hopper, brackets 40 having spring fingers 41 carried by their lower ends, the said fingers being of arcuate formation, as shown in Fig. 3, and resting upon the distributor ring 30 in position to slip into engagement with the arcuate slots as the ring is turned. When the end of a spring finger 41 rests in one of the slots 31, it engages the forward wall of the same so that backward movement of the ring will be prevented, as will be understood upon reference to Fig. 5.

From the foregoing description, it will be readily seen that I have provided an exceedingly simple and compact mechanism which may be easily secured upon an ordinary walking cultivator and operated by traction to distribute fertilizer in the furrows formed by the cultivator shovels.

Having thus described the invention, I claim:

1. A fertilizer distributor comprising a hopper, a hub member rising centrally within the hopper, a vertically disposed shaft rotatably fitted in said hub member, means carried by the under side of the hopper to rotate said shaft, a stirrer carried by said shaft and extending over and conforming to the hub member, a distributor ring fitted in the hopper between said hub member and the wall of the hopper and engageable by said stirrer whereby to rotate therewith, said distributor ring being provided with arcuate slots whereby to feed fertilizer to discharge openings in the bottom of the hopper, and a governor ring fitted on the bottom of the hopper under the distributing ring and between the hub member and the wall of the hopper and shiftable to permit or prevent the entrance of fertilizer into said discharge openings.

2. In a fertilizer distributor, the combination of a hopper, a central hub member on the bottom of the hopper, a vertically disposed shaft rotatably fitted in said hub member, means for rotating the shaft, a distributor ring fitted about said hub member between the same and the wall of the hopper and having outlet openings, stirrer fingers fitted on the upper end of the shaft to rotate therewith and extending radially therefrom over and conforming to the hub member, means whereby the fingers will move the distributing ring around the hub member, and means for yieldably holding the fingers to the hub member.

In testimony whereof I affix my signature.

GEORGE LANSDEN BILBREY. [L. S.]